Patented Nov. 29, 1932

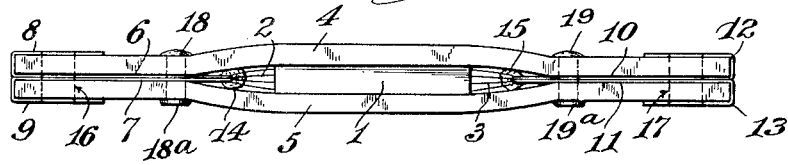

1,889,522

UNITED STATES PATENT OFFICE

WILLIAM M. BAILEY, OF LYNN, MASSACHUSETTS, ASSIGNOR, BY MESNE ASSIGNMENTS, TO GENERAL ELECTRIC COMPANY, A CORPORATION OF NEW YORK

ELECTRICAL CAPACITOR

Application filed August 23, 1928. Serial No. 301,681.

This invention relates to improvements in electrical capacitors, for radio and other electrical apparatus.

It is an object of this invention to provide a capacitor or stack condenser of alternate foils and dielectrics with terminal members having a high heat conductivity as well as good electrical conductivity.

Yet another object of this invention is the provision of rapid heat conductivity from the stack members by the use of appropriately positioned conducting leads associated with the insulating compression members in a novel arrangement of parts.

Still another object of this invention is to provide a capacitor having a relatively large external heat dissipating surface.

A further object of this invention is the provision of a capacitor which is characterized by a straight line path together with good current conductivity and low inductance.

With these and other desirable objects and advantages in view, which may be incident to said improvements, the invention consists in the parts and combinations to be hereinafter set forth and claimed, with the understanding that the several necessary elements comprising the invention, may be varied in construction, proportions and arrangement, without departing from the spirit and scope of the appended claims.

To make the invention more easily understood, there has been shown in the accompanying drawing a preferred embodiment. In these the same numerals refer to similar parts throughout the several views, in which Fig. 1 is a side elevation of a condenser in its novel arrangement of parts;

Fig. 2 is a top plan view of the device shown in Fig. 1, and

Fig. 3 is an enlarged longitudinal section of the condenser structure taken on line 3—3 of Fig. 2.

Referring now to Fig. 1. there is shown a capacitor comprising a short stack condenser 1 of alternate foils and dielectrics, with foil tabs 2, 3, of different polarity extending respectively from opposite sides of the stack. The stack 1, is held compressed in its optimum service condition by a phenolic condensation product or other insulating material strips 4, 5, in a manner which will appear more in detail hereinafter.

The foil tabs 2, 3, of opposite polarity are severally secured in good electrical and mechanical connection to pairs of thin copper strips 6—7, 10—11, by any suitable means, such as the soldered joints 14, 15, which preferably extend over the full width of the foils and terminal strips, as shown in dotted lines in Fig. 2.

The members 6, 7, 10 and 11, while preferably made of copper, may be formed of any other suitable metal having the desired physical and electrical characteristics, such as silver, aluminum and the like. The terminal strips, just described, are preferably and desirably of sufficient length to permit their extension around the ends of members 4, 5, to form terminals 8—9, 12—13.

It will be noted that these terminals 6, 7 afford a relatively large heat-conducting cross-section and also have large external areas serving to dissipate to external atmosphere the heat generated in the stack as will be discussed more in detail later. The terminals are provided with apertured portions 16, 17, extending through the metal of the terminal strips themselves and also the insulating strips 4, 5 to provide means for the connection in series of a plurality of the units comprising this invention or their attachment to any suitable device, as may be desired.

As above noted, the condenser stack 1 is held in its optimum operative condition by means of the compressive action exerted by the insulating covering members 4, 5. These members are held in their cooperative compressive relationship by means of securing members adapted to exert the requisite amount of pressure on the several parts. As shown, these securing members comprise rivets 18, 19, which are forced through the plates 4 and 5 and the mediately positioned terminal strips 6—7, 10—11, to hold them in their desired functioning relationship, the bottom portions of the rivets being upset as at 18a and 19a respectively into compressive adjustment with the insulating plates. While the securing members have been shown as rivets of the character described, it will be readily understood that they may be replaced by bolts and nuts of any appropriate construction, or by clamping members surrounding the insulating strips and not penetrating therethrough. The parts 2 and 14 and the inner ends of metal plates 6, 7, 10, 11 lie in spaces between parts 3, 4, 1 and 18.

The securing means are placed as close to the outside ends of the stack as is possible to compress the insulating strips, thus keeping the stack under uniform pressure.

Referring now to Fig. 2, it will be noted that the stack and its terminal connections are wholly situate within the borders of the insulating strips, which, while they have been described as being made of phenolic condensation product may be made of any material having the requisite electrical insulating qualities.

If desired, the space intermediate the insulating strips between the foil tabs and on either side of the stack may be filled with a suitable insulating compound, in a manner well known to those skilled in the art.

It will now be appreciated that there has been shown and described an improved electrical condenser adapted for use in radio circuits and the like, and one in which a high current carrying capacity is provided with a minimum of expense in material and labor in addition to subserving the desired functions of a high potential capacitor.

While there has been herein shown and described a specific device, it is to be understood that this is merely for the purpose of explaining the invention, for since the underlying features may be embodied in other specific mechanical structures, it is not intended to be restricted to the particular device shown except as such restrictions are clearly imposed by the appended claims.

I particularly point out and distinctly claim the part, improvement or combination which I claim as my invention or discovery, as follows:

1. A capacitor comprising a pair of elongated insulating face plates, conductive and insulating material positioned to form a stack centrally of the plates, and terminal members electrically connected to the opposite polar members of the stack and extending outwardly from the stack between the face plates, said terminal members being curved around and upon the ends of the plates to form exposed terminals, and clamping means passing through the terminal members and the insulating face plates and adapted to clamp the latter upon the stack members to hold them in their optimum cooperative relationship.

2. A capacitor comprising a stack of alternate foils and dielectrics, a pair of elongated compression members abutting the stack and extending an appreciable distance therebeyond, a plurality of terminal leads electrically and thermally connected to the foils of opposite polarity, each terminal engaging the upper and lower surface of a compression member.

3. A capacitor comprising a stack of alternate foils and dielectrics, a pair of elongated compression members abutting the stack and extending an appreciable distance therebeyond, a plurality of terminal leads electrically and thermally connected to the foils of opposite polarity, each terminal engaging the upper and lower surface of a compression member.

4. A capacitor comprising a stack of alternate foils and dielectrics, a pair of elongated compression members abutting the stack and extending an appreciable distance therebeyond, a plurality of terminal leads electrically and thermally connected to the foils of opposite polarity, each terminal engaging the upper and lower surface of a compression member and means holding the compression members in cooperative relationship.

5. A capacitor comprising a stack of alternate foils and dielectrics, a pair of elongated compression members abutting the stack and extending an appreciable distance therebeyond, a plurality of broad flat terminal leads electrically and thermally connected to the foils of opposite polarity, each terminal engaging the upper and lower surface of a compression member, and means holding the compression members in cooperative relationship.

6. An electrical condenser including two flat stack-clamping strips of insulating material and facing one another, a short stack including flat armatures projecting from a side of the stack, said stack being located between said clamping strips and said strips lying in face to face compressing relation with the end faces of the stack; said insulating clamping strips extending in at least one direction substantially beyond a side of the stack and both extending at least beyond a group of projecting stack-armatures and forming a space between the strips at said stack-side receiving said projecting armatures; compression-holding means intermediate said side of the stack and the ends of said strips which extend beyond said stack-side said holding means holding the end portions of the strips together in face to face relation with one another and holding the portions of the strips adjacent the stack-ends in clamping relation with said stack-ends forming said space at said stack-side and between the two insulating strips, said group of the projecting stack-armatures extending into said space; a pair of flat conducting strips lying face to face with one another and with the inner faces of said insulating strips and extending in opposite directions around the ends of said strips; and the exterior end-portions of said conducting strips extending parallel with one another toward said compression-holding means and parallel with and alongside the exterior faces of said insulating strips; and means in said space connecting said group of projecting stack-armatures in said space to the interiorly extending portion of at least one of said conducting strips.

7. An electrical condenser including two flat stack-clamping strips of insulating material and facing one another, a short stack including flat armatures projecting from a side of the stack, said stack being located between said clamping-strips and said strips lying in face to face clamping relation to the end faces of the stack; said insulating clamping strips extending in at least one direction substantially beyond a side of the stack and both extending at least beyond the projecting stack-armatures at said stack-side and forming a space between the strips at said stack-side receiving said armature projections; compression-holding means maintaining the compressing relation of the insulating strips to the stack-ends; and a flat conducting strip of which one end is connected to the armature-projections in said space, said conducting strip extending away from the stack and lying between and face to face with the inner faces of said insulating strips and extending exteriorly around the end of one of said insulating strips; the exterior end portion of said conducting strip further extending parallel to said insulating strip and alongside the exterior surface thereof and parallel to the portion of the conducting strip lying between the two insulating strips, said parallel portion of said insulating strip and the two parallel portions of the conducting strip on opposite faces thereof being formed with registering apertures.

8. An electrical condenser including two flat stack-clamping strips of insulating material and facing one another, a short stack including flat armatures projecting from a side of the stack, said stack being located between said clamping strips and said strips lying in face to face compressing relation with the end faces of the stack; said insulating clamping strips extending in at least one direction substantially beyond a side of the stack and both extending at least beyond a group of projecting stack-armatures and forming a space between the strips at said stack-side receiving said armature-projections; compression-holding means intermediate said side of the stack and the ends of said strips which extend beyond said stack-side said holding means holding the end portions of the strips together in face to face relation with one another and holding the portions of the strips adjacent the stack-ends in clamping relation with said stack-ends, a flat conducting strip lying between and face to face with the inner faces of said insulating strips and extending around the end of one of said insulating strips; and the exterior end-portion of said conducting strip extending parallel to said insulating strip and alongside the exterior face thereof; and means in said space connecting said group of projecting stack-armatures in said space to the interiorly extending portion of said conducting strip.

9. An electrical condenser including two flat stack-clamping strips of insulating material and facing one another, a short stack including flat armatures projecting from a side of the stack, said stack being located between said clamping strips and said strips being in face to face compressing relation with the end faces of the stack; said insulating clamping strips extending in at least one direction substantially beyond a side of the stack and both extending at least beyond the projecting stack-armatures at said stack-side and forming a space receiving said armature projections at said side of the stack between the strips; a flat conducting strip of which one end is connected to the armature-projections in said space, said conducting strip extending away from the stack and between and face to face with the inner faces of said insulating strips and extending exteriorly around the end of one of said insulating strips; the exterior end portion of said conducting strip extending parallel to said insulating strip and alongside the exterior face thereof; and compression-holding means intermediate the two ends of said conducting strip and said stack-side and holding the insulating strips in compressing relations respectively with said conducting strip and with the stack.

10. An electrical condenser including two flat stack-clamping strips of insulating material and facing one another, a short stack including flat armatures projecting from a side of the stack, said stack being located between said clamping-strips and said strips lying in face to face clamping relation with the end faces of the stack; said insulating clamping strips extending in at least one direction substantially beyond a side of the stack and both extending at least beyond the projecting stack-armatures at said stack-side and forming a space between the strips at said stack-side receiving said armature projections; compression-holding means maintaining the compressing relation of the insulating strips to the stack-ends; and a flat conducting strip of which one end is connected to the armature-projections in said space, said conducting strip extending away from the stack and lying between and face to face with the inner faces of said insulating strips and extending exteriorly around the end of one of said insulating strips; and the exterior end portion of said conducting strip further extending parallel to said insulating strip and alongside the exterior face thereof.

11. An electrical condenser including two flat stack-clamping strips of insulating material and facing one another, a short stack including flat armatures projecting from a side of the stack, said stack being located between said clamping strips and said strips lying in face to face clamping relation with the end faces of the stack; said insulating clamping strips extending in at least one direction substantially beyond a side of the stack and both extending at least beyond the projecting stack-armatures at said stack-side and forming a space between the strips at said stack-side receiving said armature-projections; a flat conducting strip of which one end is connected to the armature-projections in said space, said conducting strip extending away from the stack and lying between and face to face with the inner faces of said insulating strips and extending exteriorly around the end of one of said insulating strips; the exterior end portion of said conducting strip further extending parallel to said insulating strip and alongside the exterior surface thereof and parallel to the portion of the conducting-strip lying between the two insulating strips; and stack-compression holding-means extending transversely thru the parallel conducting and insulating strips, said stack-holding means being located substantially close to the stack but intermediate the space between the two insulating strips and the end of the insulating strip around which said conducting strip extends.

12. An electrical condenser including two flat stack-clamping strips of insulating material and facing one another, a short stack including flat armatures projecting from a side of the stack, said stack being located between said clamping-strips and said strips lying in face to face clamping relation to the end faces of the stack; said insulating clamping strips extending in at least one direction substantially beyond a side of the stack and both of them extending at least beyond said projecting stack-armatures at said stack-side and forming a space between the strips at said stack-side receiving said armature projections; a flat conducting strip of which one end is connected to the armature-projections in said space, said conducting strip extending away from the stack and lying between and parallel and face to face with the inner faces of said insulating strips; and stack-compression holding-means extending transversely thru said parallel conducting and insulating strips, said holding means being located substantially close to the stack and at a portion of the conducting strip close to the end thereof which is connected to the armature-projections in said space; the other end portion of said conducting strip beyond said holding means being exposed from said insulating strips as a terminal of the condenser.

13. An electrical condenser including two flat stack-clamping strips of insulating material and facing one another, a short stack including flat armatures projecting from a side of the stack, said stack being located between said clamping strips and said strips lying in face to face relation with the end faces of the stack; said insulating clamping strips extending in at least one direction substantially beyond a side of the stack and both of them extending at least beyond said armature-projections and forming a space between the strips at said stack-side receiving said projections; a flat conducting strip between said insulating strips and having one end connected to the armature-projections in said space, said conducting strip extending away from the stack between the insulating strips; and stack-compression holding-means clamping the stack and conducting strip respectively between the insulating strips and located outside of the stack and said space between the insulating strips but close to said space; the other end of the conducting strip beyond said holding means being exposed from the insulating strips as a terminal of the condenser.

14. An electrical condenser including two flat stack-clamping strips of insulating material and facing one another, a short stack including flat armatures projecting from the sides of the stack in two groups, said stack being located intermediate the end portions of the strips and the strips extending in both directions substantially beyond the sides of the stack and both extending at least beyond the projecting stack-armatures and forming spaces between the strips receiving said armature-projections; flat conducting strips respectively extending outwardly from said spaces but respectively connected to the armature-projections in said spaces, said outwardly projecting portions of said conducting strips lying between said insulating strips; and at least two stack-compression holding-devices clamping the stack and conducting strips respectively between the insulating strips, said holding devices being located outside of the stack and said respective spaces between the insulating strips but respectively close to said spaces; the other ends of the conducting strips which respectively extend away from said spaces and holding devices being exposed from the insulating strips as terminals of the condenser.

15. A capacitor including a stack of foils of opposite polarities and dielectric sheets, a pair of insulating face plates covering the ends of the stack and each projecting beyond two sides of the stack, terminal plates substantially the width of the foils and connected at a location between the face plates to the foils of each polarity, each terminal plate extending beyond the end of a face plate and bent over to cover part of the outer face thereof, and binding devices between the bent over ends of the terminal plates and the stack and holding the stack compressed between the insulating face plates.

16. A capacitor including a stack of foils of opposite polarities and dielectric sheets, a pair of insulating face plates covering the ends of the stack and each projecting beyond two sides of the stack, a terminal plate lying against each face plate, said terminal plate connected at a location between the face plates to the foils of one polarity, each terminal plate extending beyond the end of its face plate and bent over to cover part of the outer face thereof, and binding devices at opposite sides of the stack between the bent over ends of the terminal plates and the stack and holding the stack compressed.

In testimony whereof I hereunto affix my signature.

WILLIAM M. BAILEY.